United States Patent [19]

Komatsu et al.

[11] Patent Number: 4,985,790
[45] Date of Patent: Jan. 15, 1991

[54] MECHANISM FOR POSITIONING A TAPE CARTRIDGE

[75] Inventors: Fumito Komatsu; Kenji Hirasawa, both of Nagano, Japan

[73] Assignee: Kabushiki Kaisha Sankyo Seiki Seisakusho, Nagano, Japan

[21] Appl. No.: 263,858

[22] Filed: Oct. 28, 1988

[30] Foreign Application Priority Data

Oct. 30, 1987 [JP] Japan .................. 62-275237

[51] Int. Cl.⁵ .............................. G11B 5/008
[52] U.S. Cl. .................................... 360/96.5
[58] Field of Search ............ 360/96.5, 96.6, 96.1; 369/75.1, 77.1, 77.2

[56] References Cited

U.S. PATENT DOCUMENTS 4,785,363 11/1988 Jacobs et al. ............... 360/96.5
4,791,509 12/1988 Rademacher ............... 360/94

FOREIGN PATENT DOCUMENTS 0125765 11/1984 European Pat. Off. .
0241238 10/1987 European Pat. Off. .
0090255 5/1984 Japan .................. 360/96.5
6318570 1/1986 Japan .
6222749 2/1987 Japan .
0173662 7/1987 Japan .................. 360/96.5

Primary Examiner—David J. Severin
Attorney, Agent, or Firm—Sughrue, Mion, Zinn, Macpeak & Seas

[57] ABSTRACT

A biasing spring urges a lock member in a direction causing rollers to press a tape cartridge against reference surfaces of a tape drive device. An ejector lever retains the lock member in a cartridge processing release position. The ejector lever is shifted during cartridge insertion whereby the lock member moves to a second cartridge pressing position under the biasing spring to cause the rollers to press the tape cartridge against those reference surfaces.

9 Claims, 4 Drawing Sheets

MECHANISM FOR POSITIONING A TAPE CARTRIDGE

FIELD OF THE INVENTION

This invention relates to a tape cartridge positioning mechanism for use in a tape drive device employing a magnetic tape housed in a box such as a cartridge forming a cassette.

BACKGROUND OF THE INVENTION

There have been used in many applications tape recorders of the cartridge type in which by insertion of a cartridge holding a magnetic tape, signals are recorded on the magnetic tape in the cartridge, and the recorded signals are reproduced. In such cartridge-type tape recorders, during insertion of the cartridge, the cartridge has to be properly located or positioned in a recording and reproducing position.

FIG. 9 shows one example of cartridge positioning mechanisms used in the conventional tape recorders. In FIG. 9, a cartridge 1 holding a magnetic tape includes at its bottom a plate 2 having a notch 2a. A shaft 4 has a roller 3 fixedly mounted thereon urged upwardly by a leaf spring 5 so as to press the roller 3 against the peripheral edge of the notch 2a. As such, the cartridge 1 is pressed against an upper reference surface (not shown) disposed horizontally and a right-hand reference surface (not shown) disposed vertically, thereby effecting the positioning of the cartridge 1.

As disclosed in Japanese Laid-Open Patent Application (Kokai) No. 59-213056, there is also known another method in which, when inserting and discharging the cartridge, the pressing force applied by the roller to the cartridge is released with the use of a click spring, and after the insertion of the cartridge, a lever is angularly moved to cause the roller to press against the cartridge, thereby achieving the positioning of the cartridge.

With the cartridge positioning mechanism shown in FIG. 9, the spring force is always applied to the roller which serves to position the cartridge. Therefore, this mechanism has the disadvantage that it is not satisfactory in operability since the force required, when the cartridge is manipulated to be inserted and discharged, is large. Also, another conventional cartridge positioning mechanism is of the type in which the roller is pressed against the cartridge by angularly moving the lever after the insertion of the cartridge. While no large force is required to manipulate the cartridge during insertion and discharge thereof, one additional step is needed during both the positioning of the cartridge and the discharge thereof, which is not desirable from a viewpoint of operability.

The present invention overcomes the above problems, and an object of this invention is to provide a tape cartridge positioning mechanism which is operable in response to the inserting and discharging operations of the cartridge, respectively, to press the rollers against the cartridge and to release the pressing force to thereby enable the insertion and discharge of the cartridge with a small force, and which accurately positions the cartridge by merely inserting the cartridge, thereby improving the operability.

SUMMARY OF THE INVENTION

According to the present invention, there is provided a mechanism for positioning a tape cartridge comprising:

reference surfaces for positioning the tape cartridge;

rollers for pressing the tape cartridge against the reference surfaces;

a lock member for selectively holding each of the rollers in a cartridge pressing position and in a cartridge pressing release position;

retaining means for retaining the lock member in a cartridge pressing release position;

retaining release means for releasing the retaining of the lock member by the retaining means when the tape cartridge is inserted to a predetermined position; and biasing means for biasing the lock member in such a direction that the rollers press the tape cartridge against the reference surfaces.

When the tape cartridge is inserted to a predetermined position, the retaining release means releases the retaining of the lock member by the retaining means, so that the lock member is moved in the direction of the bias effected by the biasing means. By the movement of the lock member, the rollers press the tape cartridge against the reference surfaces to position the tape cartridge. When the lock member is moved against the biasing force, the lock member holds the rollers in a cartridge pressing release position to thereby enable the discharge of the cartridge, and the retaining means retains the lock member in the cartridge pressing release position.

BRIEF DESCRIPTION OF THE DRAWINGS

A tape cartridge positioning mechanism embodying the invention will now be described with reference to the drawings.

DESCRIPTION OF PREFERRED EMBODIMENTS

Figure 1:
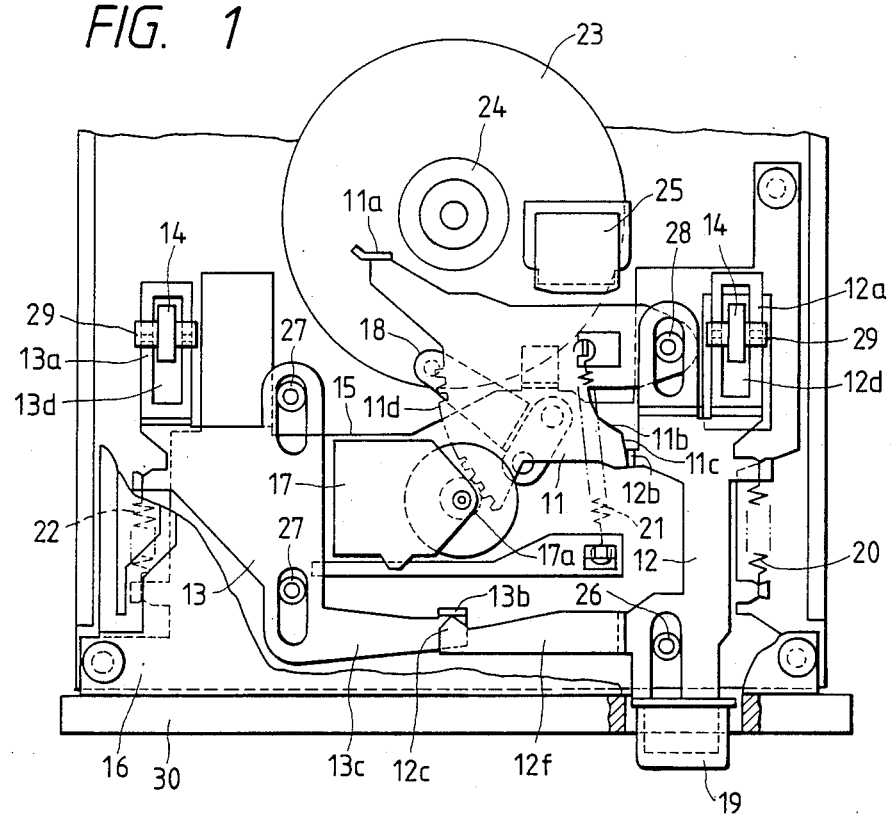
FIG. 1 is a plan view of a tape cartridge positioning mechanism forming one embodiment of the present invention.
Figure 2:
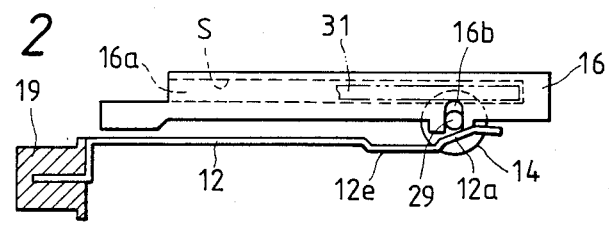
FIG. 2 is a side-elevational view of a cartridge pressing mechanism portion of the positioning mechanism of FIG. 1.

In FIGS. 1 and 2, reference numeral 16 denotes a guide frame of a tape recorder, and a front bezel 30 is fixedly secured to a front end (shown at the bottom in FIG. 1) of the guide frame 16. An opening for inserting a tape cartridge C is formed in the front bezel 30. Cartridge insertion guide grooves 16a (FIG. 2) for guiding the tape cartridge, inserted through the above-mentioned insertion opening, are formed in right and left side portions of the guide frame 16, respectively. The tape cartridge used in this embodiment is, for example, one employed for the back-up of a memory of a computer, and has a plate 31 of metal secured to a bottom thereof as shown in FIG. 7. The plate 31 has positioning or registration notches 31a formed therethrough at opposite side portions thereof. The opposite side portions of the plate 31 are inserted into the guide grooves 16a, respectively, so as to guide the movement of the cartridge.

Figure 2A:
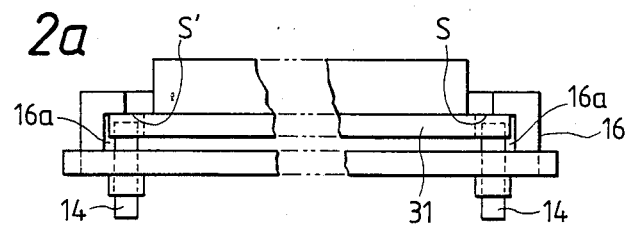
FIG. 2a is a front view of the guide frame showing the reference surfaces formed thereby.

Roller guides 16b (FIG. 2), each in the form of a vertically extending groove are provided at the opposite sides of the guide frame 16, at a lower portion thereof. A shaft 29 of each roller 14 is received in a respective one of the roller guides 16b for vertical movement therealong. The right- and left-hand rollers 14 (FIG. 1) serve to press the tape cartridge against reference surfaces S and S', respectively, of the guide frame 16, FIGS. 2, 2a, and are movable into the guide grooves 16a and 16a, respectively, through respective openings formed through the guide frame 16 at the lower portion thereof.

An ejector lever 11 is mounted below the guide frame 16 on a shaft 28 for angular movement about the shaft 28 in a horizontal plane, the shaft 28 being secured to the guide frame 16. A distal end of the ejector lever 11 is bent to form a cartridge engaging portion 11a, and the ejector lever 11 has a fan-shaped gear portion 11d intermediate opposite ends thereof, an arcuate retaining portion 11b which is formed by providing a notch adjacent to the shaft 28, and a flat abutment portion 11c extending forwardly from one end of the retaining portion 11b remote from the shaft 28. The fan-shaped gear portion 11d is in mesh with a gear 17a of a damper unit 17 so as to dampen and make smooth the angular movement of the ejector lever 11. The ejector lever 11 is urged by a spring 21 to be angularly moved in a counterclockwise direction (FIG. 1). When the tape cartridge is guided by the guide grooves 16a and 16a of the guide frame 16 and inserted, the rear end of the tape cartridge is brought into engagement with the cartridge engaging portion 11a of the ejector lever 11 to angularly move the ejector lever 11 in a clockwise direction against its biasing force. And, when the ejector lever 11 is angularly moved by its biasing force the cartridge is pushed forwardly by the cartridge engaging portion 11a.

Figure 4:
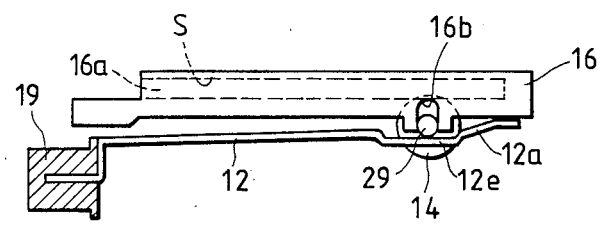
FIG. 4 is a side-elevational view similar to FIG. 2 showing the operating condition of FIG. 3.

A lock member 12 is mounted on the underside of the guide frame 16 at the right-hand side thereof (FIG. 1). The lock member 12 is movable in forward and rearward directions through a guide member mounted on the shaft 28 and a guide member 26 mounted on the guide frame 16. An ejector button 19 is fixedly secured to a front end of the lock member 12 and projects beyond the front bezel 30. Formed through the lock member 12 at its rear end is an opening 12d in which the right-hand roller 14 is received. The shaft 29 of the roller 14 is borne by lateral edge portions of the lock member, about opening 12d. This bearing portion for supporting the roller 14 comprises a wedge portion 12a formed by bending wedge portions 12a obliquely and an escape portion 12e (FIG. 2) extending forwardly from a front end of the wedge portion 12a and recessed away from the guide frame 16. When the lock member 12 is in its rearward position, the shaft 29 is disposed on the escape portion 12e as shown in FIG. 4, so that the roller 14 is in its lowered position to release the pressing of the cartridge by the roller 14. On the other hand, when the lock member 12 is moved forwardly, the shaft 29 is pushed by the wedge portion 12a, as shown in FIG. 2, to cause the roller 14 to intrude into the notch 31a (FIG. 7a) in the plate 31 of the tape cartridge C inserted to the predetermined position, so that the roller 14 presses the cartridge against the reference surfaces, that is, top surfaces S, S' of the guide grooves 16a in the guide frame 16, thereby positioning the cartridge.

Figure 3:
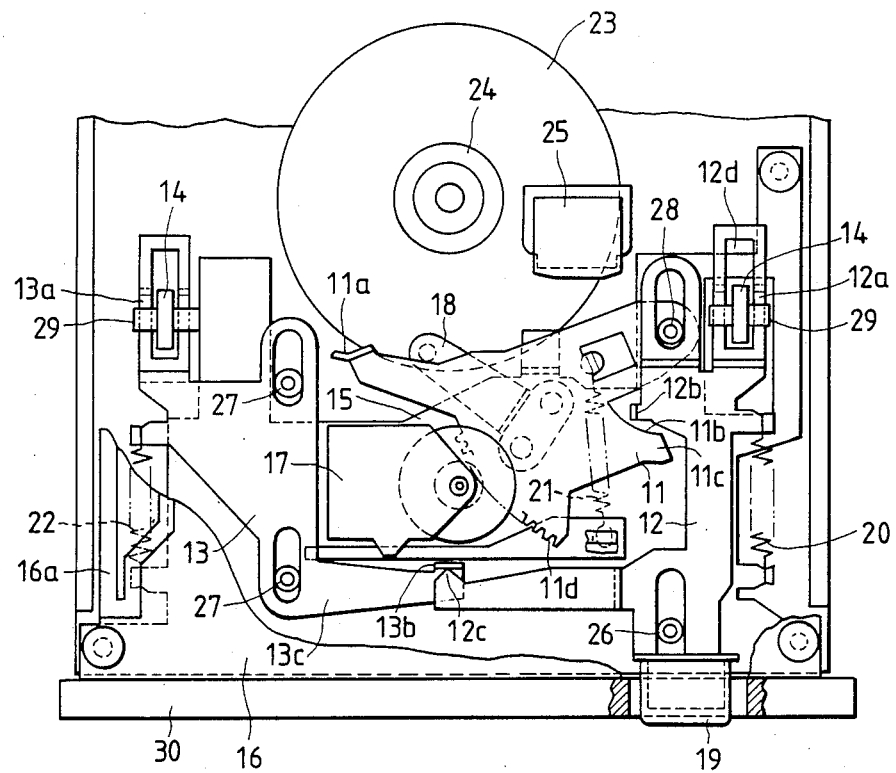
FIG. 3 is a plan view similar to that of FIG. 1 showing another operating condition of the mechanism.

The lock member 12 is urged by a spring 20, serving as biasing means, forwardly, that is, in such a direction that the roller 14 presses the cartridge against the reference surfaces. The lock member 12 has a bent portion 12b formed on a left-hand side edge thereof (FIG. 1) at a position facing the retaining portion 11b and abutment portion 11c of the ejector lever 11. The lock member also has an arm 12f extending therefrom in a left-hand direction adjacent to the front end thereof. The arm 12f has an engaging portion 12c at its distal end. The bent portion 12b of the lock member 12 and the retaining portion 11b of the ejector 11 constitute a retaining means for retaining the lock member 12 in a cartridge pressing release position. As shown in FIG. 3, when the lock member 12 is pushed rearwardly against its biasing force to release the pressing of the cartridge by the roller 14, the ejector lever 11 is angularly moved in its biased direction, so that the retaining portion 11b is moved into a path of movement of the bent portion 12b of the lock member 12 to prevent the cartridge release movement of the lock member 12 in its biased direction. In this condition, when the cartridge is inserted to the predetermined position, the engaging portion 11a is pushed by the rear end of the cartridge to angularly move the ejector lever 11 in a clockwise direction against its biasing force, so that the retaining portion 11b of the ejector lever 11 is disengaged from the bent portion of the lock member 12 to allow the lock member 12 to move forwardly under its biasing force. As a result of this movement of the lock member 12, the bent portion 12b is held in engagement with the abutment portion 11c as shown in FIG. 1 thereby preventing the ejector lever 11 from angularly moving in its biased direction. Thus, the abutment portion 11c of the ejector lever 11 serves as a retaining release means for releasing the retaining of the lock member 12 by the retaining portion or means 11b when the cartridge is inserted to a predetermined position.

A support plate 13 is mounted below the guide frame 16 at a left-hand side portion thereof (FIG. 1). The support plate 16 is movable in forward and rearward directions through two guide pins 27 mounted on the guide frame 16, and is biased by a spring 22 to move forwardly. The support plate 13 has an arm 13c extending from its front end in a right-hand direction, and the arm 13c has a bent portion 13b formed at its distal end, at its rearward edge. The bent portion 13b is engaged with the engaging portion 12c of the lock member 12, so that the movement of the support plate 13 in its biased direction is limited. The support plate 13 has at its rear end portion an opening 13d in which the left-hand roller 14 is received. A shaft 29 of the left-hand roller 14 is borne by lateral edge portions of this opening. This bearing portion for supporting the shaft 29 has a wedge portion 13a formed by bending it obliquely, and an escape portion extending forwardly from a front end of the wedge portion 13a and recessed away from the guide frame 16, as described above for the bearing portion of the lock member 12, for supporting the shaft 29 of the right-hand roller 14. When the support plate 13 is in its rearward position the shaft 29 is disposed on the escape portion, so that the roller 14 is in its lowered position to release the pressing of the cartridge by the roller 14. When the support plate 13 is moved forwardly, the shaft 29 is pressed by the wedge portion 13a, so that the roller 14 pushes the plate 31 of the tape cartridge, inserted to the predetermined position, to press the cartridge against the references surfaces, thereby positioning the cartridge.

In FIG. 1, a capstan motor 23 is mounted at a central rear portion, and a capstan roller 24 of the motor 23 projects beyond the guide frame 16. A magnetic head 25 is arranged on the guide frame 16 on the right side of the capstan roller 24. A cover member 15 is secured to the underside of the guide frame 16 so as to cover these components from below them. A leaf spring 18 is fixedly secured at one end to the cover member 15 beforehand by a suitable fastening means such as pressing. When the cover member 15 is fixedly mounted in place, the distal end of the leaf spring 18 is held in contact with the peripheral edge portion of the capstan motor 23 at its front portion (FIG. 1) so as to urge the capstan roller 24 against a roller adjacent to the cartridge. One end of the biasing springs 20 and 22 are engaged respectively with lock member 12 and support plate, respectively and other end springs engage frame 16. Information is recorded on the tape and reproduced through the magnetic head 25 disposed in sliding contact with the tape.

Figure 5C:
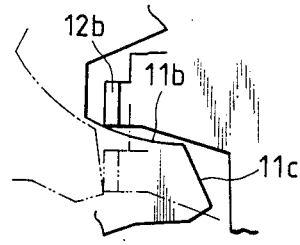

For ejecting the cartridge, the ejector button 19 is pushed rearwardly so as to move the lock member 12 rearwardly against its biasing force. The rearward movement of the lock member 12 causes the engaging portion 12c to push the bent portion 13b of the support plate 13 so as to move the support plate 13 rearwardly against its biasing force, as shown in FIG. 6(c). Upon rearward movement of the lock member 12, the pressing of the shaft 29 of the right-hand roller 14 by the wedge portion 12a of the lock member 12 is released, so that the shaft 29 escapes to the escape portion 12e as shown in FIGS. 4 and 7(c), thereby releasing the pressing of the cartridge by the roller 14. Similarly, upon rearward movement of the support plate 13, the pressing of the shaft 29 of the left-hand roller 14 by the wedge portion 13a of the support plate 13 is released, thereby releasing the pressing of the cartridge by the left-hand roller 14. Also, upon rearward movement of the lock member 12, the bent portion 12b is moved rearwardly from the abutment portion 11c of the ejector lever 11 to the retaining portion 11b as shown in FIGS. 3 and 5(c), to thereby angularly move the ejector lever 11 by its biasing force in a clockwise direction (FIG. 3), so that the cartridge engaging portion 11a of the ejector lever 11 pushes the cartridge forwardly. Upon this angular movement of the ejector lever 11, the retaining portion 11b moves into the path of movement of the bent portion 12b of the lock member 12 and is disposed forwardly of the bent portion 12b to thereby prevent the lock member 12 from moving by its biasing force, retaining portions formed on the cover member 15.

The operation of the above embodiment will now be described with reference to FIGS. 1 to 7.

Figure 5A:
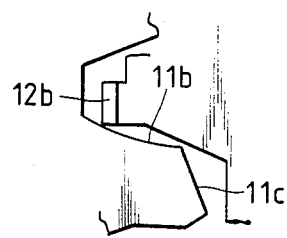
FIGS. 5a, 5b and 5c are plan views of portions of an ejector lever and lock member of the positioning mechanism in different positions, showing the operation of retaining means.
Figure 5B:
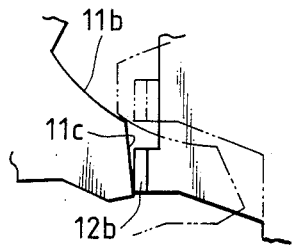
Figure 6A:
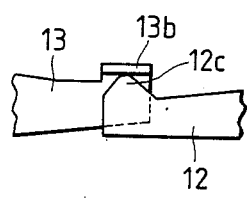
FIGS. 6a, 6b and 6c are plan views of portions of the lock member and support plate of the positioning mechanism in different positions, showing the connection therebetween.
Figure 7A:
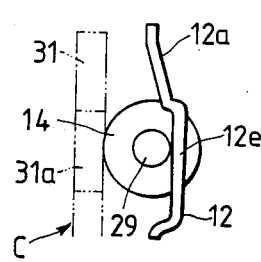
FIGS. 7a, 7b and 7c are fragmentary, side-elevational views of the cartridge pressing mechanism portion showing its operation.

FIGS. 3, 4, 5(a), 6(a) and 7(a) show the condition before the tape cartridge is inserted. In this condition, the lock member 12 is held in its rearward position against its biasing force, and as shown in FIG. 5(a), the bent portion 12b of the lock member 12 is retained by the retaining portion 11b of the ejector lever 11 to prevent the movement of the lock member 12 in its biased direction. And, as shown in FIG. 7(a), the shaft 29 of the right-hand roller 14 is disposed on the escape portion 12e, so that the roller 14 is in the cartridge pressing release position. Also, since the lock member 12 is pushed rearwardly against its biasing force, the bent portion 13b of the support plate 13 is pushed rearwardly by the engaging portion 12c of the lock member 12 as shown in FIG. 6(a), so that the support plate 13 is pushed rearwardly against its biasing force to release the pressing of the left-hand roller 14 by the support plate 13, thereby holding the roller 14 in the cartridge pressing release position.

Figure 6B:
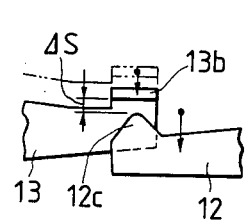
Figure 6C:
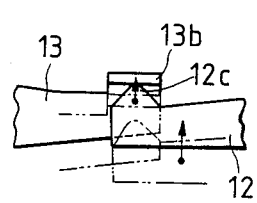
Figure 7B:
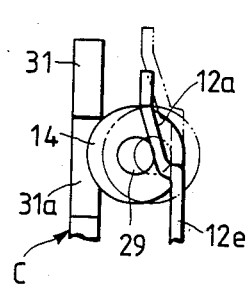
Figure 7C:
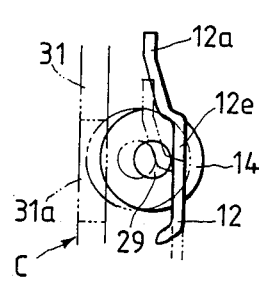

In this condition, when the cartridge C is inserted to the predetermined position along the guide grooves 16a, the engaging portion 11a of the ejector lever 11 is pushed by the rear end of the cartridge, so that the ejector lever 11 is angularly moved in a clockwise direction against its biasing force. As a result, as shown in FIGS. 1 and 5(a), the retaining portion 11b of the ejector lever 11 is disengaged from the bent portion 12b of the lock member 12 to move the lock member 12 forwardly by its biasing force, so that the bent portion 12b is brought into engagement with the abutment portion 11c of the ejector lever 11 to prevent the angular movement of the ejector lever 11 in its biased direction, thereby preventing the ejection of the cartridge. Upon forward movement of the lock member 12, the wedge portion 12a pushes the shaft 29 to press the roller 14 against the cartridge, as shown in FIG. 2 and FIG. 7(b). Due to this pressing force, the roller 14 intrudes into the notch 31a in the plate 31 of the cartridge C and comes into engagement with the rear peripheral edge of the notch 31a to push the cartridge upwardly and rearwardly into contact with the reference surfaces S. S', thereby positioning the cartridge in the predetermined position. Also, upon forward movement of the lock member 12, the engaging portion 12c of the lock member 12 escapes from the bent portion 13b of the support plate 13 as shown in FIG. 6(b), so that the support plate 13 is moved forwardly by its biasing force. As a result, the wedge portion 13a of the support plate 13 pushes the shaft 29 of the left-hand roller 14 upwardly to press the roller 14 against the plate 31 of the cartridge, so that the left-hand roller 14 cooperates with the right-hand roller 14 to position the cartridge C in the predetermined position. As shown in FIG. 6(b), the stroke of movement of the support plate 13 is smaller by S than that of the lock member 12 so as to ensure that the right- and left-hand rollers 14 uniformly press the cartridge.

In this manner, the cartridge is positioned in the predetermined position, and in this condition the capstan motor 23 is driven to feed the tape so that the signals are thus returning the above component parts to their initial positions as shown in FIGS. 3, 4, 5(a), 6(a) and 7(a).

As described above, in this embodiment, when the cartridge is inserted to the predetermined position, the engagement of the retaining portion 11b of the ejector lever 11, serving as the retaining means, with the bent portion 12b of the lock member 12 is released, so that the lock member 12 is allowed to move in its biased direction. At this time, the rollers 14 are moved to their cartridge pressing positions for the first time so as to press the cartridge against the reference surfaces. Therefore, the manipulating force required for inserting the cartridge is small. For discharging the cartridge, the lock member 12 is moved against is biasing force so as to release the pressing of the cartridge by the rollers 14 and then to angularly move the ejector lever 11. Therefore, the force required for discharging the cartridge is also small. Thus the positioning mechanism is excellent in terms of operability. In addition, when the cartridge is to be charged into the positioning mechanism, all that has to be done is to insert the cartridge to the predetermined position. When the cartridge is to be discharged, all that has to be done is to manipulate the lock member 12. For example, there are no cumbersome operations required such as a locking operation after the cartridge is inserted to the predetermined position, and a discharging operation after effecting the lock releasing operation. Thus, in these respects, the tape cartridge positioning mechanism is excellent in terms of operability.

In the above-mentioned embodiment, the lock member 12 and the support plate 13 may be formed integrally with each other. Also, each of the lock member 12 and the support plate 13 may be arranged to directly press the roller 14, not through the shaft 29. In addition, each roller 14 may be replaced by a spherical or ball member.

Figure 8:
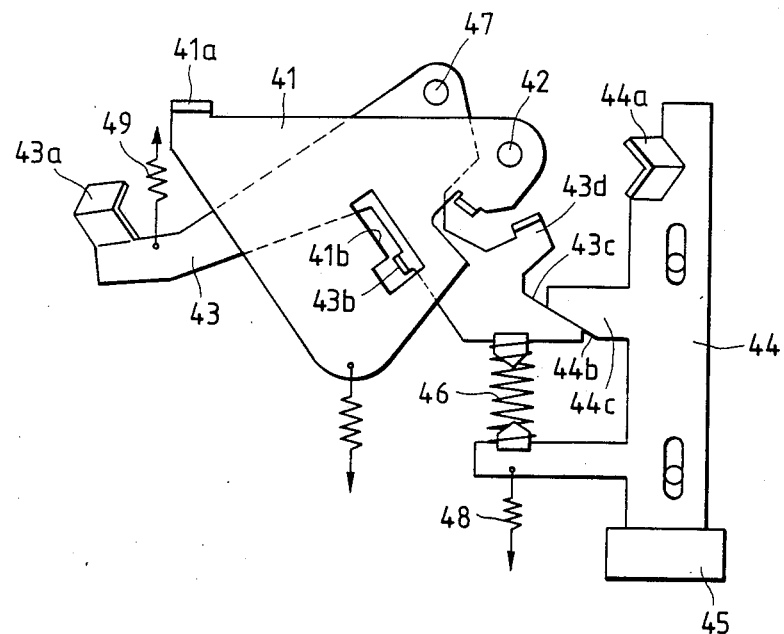
FIG. 8 is a plan view of a modified tape cartridge positioning mechanism forming a second embodiment of the invention.
Figure 9:
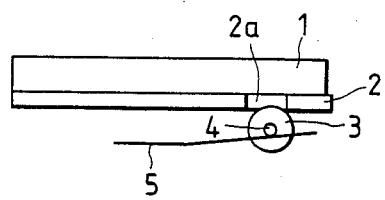
FIG. 9 is a side-elevational view of a prior art tape cartridge positioning mechanism.

In the above-mentioned embodiment, although each of the lock member 12 and the support plate 13 is moved linearly, each may be modified to be angularly moved. Further, the lock member 12 and the support plate 13 may be modified to move in opposite directions to hold the rollers in the cartridge pressing position and in the pressing release position. FIG. 8 shows one such modification of the invention.

In FIG. 8, a lock member 44, which is movable in forward and rearward directions, has, at its rear end portion a wedge portion 44a for pressing the roller against the cartridge. The lock member 44 also has an arm 44c extending from one side thereof in a left-hand direction, and the arm 44c has an inclined surface 44b formed at its distal end, at its front edge. Disposed on the left-side of the lock member 44 is another lock member 43 which is angularly movable in a horizontal plane about a shaft 47. The lock member 43 has, at a distal end thereof, a wedge portion 43a for pressing another roller against the cartridge. The other arm of the lock member 43 has an inclined surface 43c engaging the inclined surface 44b of the lock member 44, and a projection 43d disposed rearwardly of the inclined surface 43c and engageable with the arm 44c of the lock member 44. The lock member 44 is urged by a spring 48, serving as biasing means, to be moved forwardly, and the other lock member 43 is urged by a spring 49, serving as biasing means, to be angularly moved in a clockwise direction. A compression coil spring 46 is interposed between the lock members 44 and 43. An ejector lever 41 is arranged in overlying relation to the lock member 43 and is angularly movable about a shaft 42 in a horizontal plane. The ejector lever 41 is biased for angular movement in a counterclockwise direction, and has, at a distal end a cartridge engaging portion 41a formed by a bending operation and a lock slot 41 of a reversed L-shape at a central portion thereof, the lock slot serving as retaining means. A bent portion 43b formed on the lock member 43 is received in the lock slot 41b.

When the cartridge is not inserted, the ejector lever 41 is angularly moved in a counterclockwise direction by its urging force, and the lock member 43 is angularly moved in a counterclockwise direction against its urging force, with its bent portion 43b disposed in a longer leg portion of the lock slot 41b so that the lock member 43 is prevented from angular movement in its biased direction. The inclined portion 44b of the lock member 44 is pushed by the inclined surface 43c of the lock member 43, so that the lock member 44 is moved rearwardly against its biasing force. In these conditions of the lock members 43 and 44, their wedge portions 43a and 44a are in their cartridge pressing release positions.

Then, when the cartridge is inserted to its predetermined position, the engaging portion 41a of the ejector lever 41 of the ejector lever 41 is pushed by the rear end of the cartridge to angularly move the ejector lever 41 in a clockwise direction against its urging force. As a result, the bent portion 43b of the lock member 43 is moved to a corner portion of the lock slot 41b where the longer and shorter leg portions thereof merge together, and the lock member 43 is angularly moved in a clockwise direction by its biasing force of spring 49, so that the bent portion 43b is introduced into the shorter leg portion of the lock slot 41b, thereby preventing the ejector lever 41 from angularly moving in its urged direction. Due to this angular movement of the lock member 43, the inclined surface 43c escapes forwardly from the inclined surface 44b of the lock member 44 to allow the lock member 44 to move forwardly by the biasing force of spring 48. As a result of these movements of the lock members 43 and 44, their wedge portions 43a and 44a are moved to their respective cartridge pressing positions to press the rollers (not shown) against predetermined portions of the cartridge, thereby positioning the cartridge.

For discharging the cartridge, an ejector button 45 secured to the front end of the lock member 44 is pushed to move the lock member 44 rearwardly against its biasing force. Upon rearward movement of the lock member 44, the arm 44c pushes the projection 43d of the lock member 43 to angularly move the lock member 43 in a counterclockwise direction against its urging force. As a result of these movements of the lock members 44 and 43, the cartridge pressing release condition is achieved. As a result of the above angular movement of the lock member 43, the bent portion 43b is moved out of the shorter leg portion of the lock slot 41b to allow the ejector lever 41 to angularly move in its biased direction, thereby discharging the cartridge.

In this embodiment, also, since the cartridge is inserted and discharged in the cartridge pressing release condition, the manipulating force required for the insertion and discharge of the cartridge is small. When the cartridge is to be charged into the positioning mechanism, all that has to be done is to insert the cartridge, and for discharging the cartridge, all that has to be done is to move the lock member 44 against its urging force. Therefore, the inserting and discharging operations of the cartridge are simple, and excellent operability is assured.

Incidentally, if a solenoid is used to operate the lock member, operability can be further improved, and an automatic ejection can also be accomplished. For example, the lock member may be connected to a plunger of one solenoid through a known push/push mechanism. When the solenoid is first energized, the push/push mechanism moves the lock member to a predetermined position. Then, the solenoid is again energized, the push/push mechanism returns the lock member to its initial position. Therefore, if, upon detecting the movement of the cartridge to the predetermined position, the solenoid is energized, the cartridge can be pressed against the reference surfaces to effect the positioning of the cartridge. If the solenoid is again energized in response to the operation of an ejector switch or any suitable signal, the cartridge can be discharged. In the case where there is no need to provide the automatic ejectio, the use of the ejector lever can be obviated, and the solenoid can be energized upon detecting the insertion of the cartridge, and the solenoid can be again energized in response to an ejection signal. In such a mechanism using the solenoid, the plunger of the solenoid or the push/push mechanism constitutes the retaining means and the retaining release means.

The present invention is applicable to any type of tape contained in a box-like casing regardless of their names. For example, it is applicable to those called a cassette tape, a cartridge tape and a tape pack. Also, this invention is applicable to various kinds of tape recorders such as an audio tape recorder of the analogue or the digital type, a video tape recorder and a tape recorder used as an external memory for a computer.

According to the present invention, when the cartridge is inserted to the predetermined position, the retaining condition maintained by the retaining means is released to move the lock member in its biased direction. At this time, the rollers are moved to the cartridge pressing positions for the first time, thereby pressing the cartridge against the reference surfaces. Therefore, the manipulating force required for inserting the cartridge is small. For discharging the cartridge, the lock member is moved against its biasing force to release the pressing of the cartridge by the rollers, and thereafter the cartridge is discharged. Therefore, the manipulating force required for discharging the cartridge is also small. Thus, the positioning mechanism according to the invention has excellent operability. Further when the cartridge is to be charged into the positioning mechanism, all that has to be done is to insert the cartridge to the predetermined position. For discharging the cartridge, all that has to be done is to manipulate the lock member. For example, there are no cumbersome operations required such as a locking operation after the cartridge is inserted to the predetermined position, and a discharging operation after effecting the lock releasing operation. Thus, in these respects, the present invention provides the tape cartridge positioning mechanism of excellent operability.

What is claimed is:

1. A mechanism for positioning an insertable and ejectable tape cartridge in a tape drive device comprising:
    reference surfaces for positioning the tape cartridge in a tape record and play position within said device;
    a pair of positioning rollers for pressing the tape cartridge against said reference surfaces;
    means including a lock member for selectively holding both of said rollers in a cartridge pressing position and in a cartridge pressing release position, said lock member including a lever movable in the tape cartridge inserting and discharging directions, and said lever having a wedge portion for maintaining both of said positioning rollers in the tape cartridge pressing position against said reference surfaces and a keeping portion for keeping said positioning rollers in the tape cartridge pressing release position;
    retaining means for retaining said lock member in the cartridge pressing release position;
    retaining releasing means for releasing the retaining means when the tape cartridge is inserted to a predetermined position; and
    biasing means for urging said lock member in a direction causing said rollers to press the tape cartridge against said reference surfaces.

2. A mechanism according to claim 1 in which said lock member has an ejection operating portion exposed exterior to and at the front of said tape drive device.

3. A mechanism according to claim 1 in which means including said lock member comprises at least two components supporting said rollers, respectively, independently of each other.

4. A mechanism according to claim 1, wherein said lock member is moved in tape cartridge inserting and discharging directions.

5. A mechanism according to claim 1, further comprising:
    ejector means for biasing said cartridge in a direction to discharge the tape cartridge from the tape drive device; and
    engaging means for engaging said ejector means in the tape cartridge inserted position.

6. A mechanism for positioning an insertable and ejectable tape cartridge in a tape drive device at a tape record and play position comprising:
    ejector means for engagement with a rear end of the tape cartridge when inserted into said drive device;
    first biasing means for biasing said ejector means in a direction tending to discharge the tape cartridge from the tape drive device;
    a pair of rollers for positioning the tape cartridge;
    reference surfaces for locating the tape cartridge at said tape record and play position;
    means including a lock member for urging both of said rollers in a direction of positioning of the tape cartridge at said tape record and play position and means mounting said lock member for sliding motion in a direction of insertion of the tape cartridge within said tape drive device;
    second biasing means for biasing said lock member into engagement with said ejection means and towards cartridge release position from said reference surfaces;
    engaging means for keeping said ejector means into engagement with said lock member so as to prevent application of biasing forces of said first and second biasing means to the tape cartridge when the tape cartridge is fully inserted in said tape drive device; and
    said ejector means further including a retaining portion for maintaining said lock member under the condition in which said rollers are not pressing the tape cartridge against the reference surfaces when the tape cartridge is not fully inserted.

7. A mechanism according to claim 6 in which said ejector means is mounted for angular movement and wherein said mechanism second biasing means biases said angularly movable ejector means in the tape cartridge discharging direction.

8. A mechanism according to claim 6, wherein said engaging means comprises an engaging portion of said lock member and an abutment portion of said ejector means, said abutment portion being engaged with said engaging portion so as to maintain said ejector means in a tape cartridge inserted position.

9. A mechanism for positioning an insertable and ejectable tape cartridge in a tape drive device comprising:
reference surfaces for positioning the tape cartridge at a tape record and play position;
a pair of rollers for pressing the tape cartridge against said reference surfaces;
a guide frame provided in said tape drive device for guiding the tape cartridge;
guide grooves formed in said guide frame receiving and guiding said rollers respectively for movement in a direction of positioning of the tape cartridge;
means including a lock member for selectively supporting both of said rollers in said guide grooves respectively for movement between a first position where said rollers press the tape cartridge against said reference surfaces and a second position where said rollers release the pressing of the tape cartridge from the reference surfaces, means for mounting said lock member for movement in tape cartridge inserting and discharging directions;
ejector means operatively engaging said lock member for urging the tape cartridge in the tape cartridge discharging direction; and
engaging means for engaging said ejection means in the tape cartridge full insertion position.

* * * * *